Oct. 1, 1946.        C. A. DONALDSON            2,408,414
                     ABSOLUTE ALTIMETER
             Filed June 19, 1939          2 Sheets-Sheet 2

INVENTOR.
Charles A. Donaldson

Patented Oct. 1, 1946

2,408,414

UNITED STATES PATENT OFFICE 2,408,414

ABSOLUTE ALTIMETER

Charles A. Donaldson, Del Rio, Tex.

Application June 19, 1939, Serial No. 279,949

5 Claims. (Cl. 315—24)

This invention relates to a means for measuring and registering distances from the surface of a mass with particular reference to "blind flying" or the navigation of an airplane in a low visibility atmosphere for the purpose of ascertaining distances, vertical or horizontal, and attaining that result by means of a combination of oscillators and detectors using high-frequency radio waves together with a grid controlled cathode-ray tube, or tubes as hereinafter described.

An object of my invention is to provide a sending and a receiving means whereby an intermittent or a modulated high-frequency radio wave is radiated from the sending oscillator to the surface of the earth or other mass and reflected to the receiver, and the time between the sending and the receiving of the reflected wave is shown as a definite space or distance on the cathode-ray tube trace, which space is calibrated to show by direct reading the true distance from the reflecting mass.

Radio waves are propagated with a speed of approximately 186,000 miles per second or approximately 972,000,000 feet per second. Since, in this apparatus, the wave must travel to the reflecting mass and return, the speed for the reading is one-half or 486,000,000 feet per second and a 1,000 feet reading will take 1/486,000 second. Therefore, if the electron beam in a cathode-ray tube is deflected by a sweep frequency of 486 kilocycles, a complete cycle of the electron beam will take place in the time necessary for the radio wave to travel 1,000 feet and return, and the full trace will give a reading of 1,000 feet. By using a sweep frequency of 4,860 kilocycles, the trace will give a reading of 100 feet and by using a sweep frequency of 48.6 kilocycles the trace will give a reading of 10,000 feet.

In this instrument I use a cathode-ray tube with both sets of deflection plates driven by the same timing frequency, but the phase on one set of plates displaced 90 degrees from that on the other so that the electron beam describes a circle. I refer to these two voltages as the quarter-phase voltage. By varying this quarter-phase voltage from zero to maximum, the electron beam is caused to trace a spiral from the center to the circumference of the screen. In this instrument I use a high negative bias on the grid of the cathode ray tube so that the electron beam trace becomes almost invisible. Then the signal is applied to the grid as a positive pulse, overcoming the negative bias and causing a bright spot to appear on the trace for the duration of the signal. Since the signal comes at the same point of angular orientation for each revolution of the electron beam, it will trace a radial line from the center to the circumference of the screen. By using a sharp pulse such as that obtained from a blocking oscillator, this line may be made very narrow and used as a pointer, from which the distance of the reflecting mass may be read on a calibrated scale around the screen.

In this instrument it is preferable to use one of the ultra high-frequencies of the order of 300 megacycles or higher so that the high-frequency oscillator may reach full out-put and block in a small fraction of the low-frequency cycle. Also the use of such a high-frequency makes it possible to use a simple, highly directive antenna system so that the waves may be confined to a narrow beam which may be sent in any direction. These ultra-high-frequency waves are also reflected much more than the longer waves, and the sending and receiving antennas may be effectively screened from each other so that there is no direct pick-up. When the beam is directed downward, the instrument will give the altitude. If it is directed forward; however, it will show when there is a reflecting mass ahead and act as a collision preventative.

This invention may be fully understood from the following description when read in connection with the accompanying drawings in which similar symbols are used to represent similar parts and in which Fig. 1 is a schematic diagram of one form of my invention in which I use short pulses of radio waves.

Figure 1:
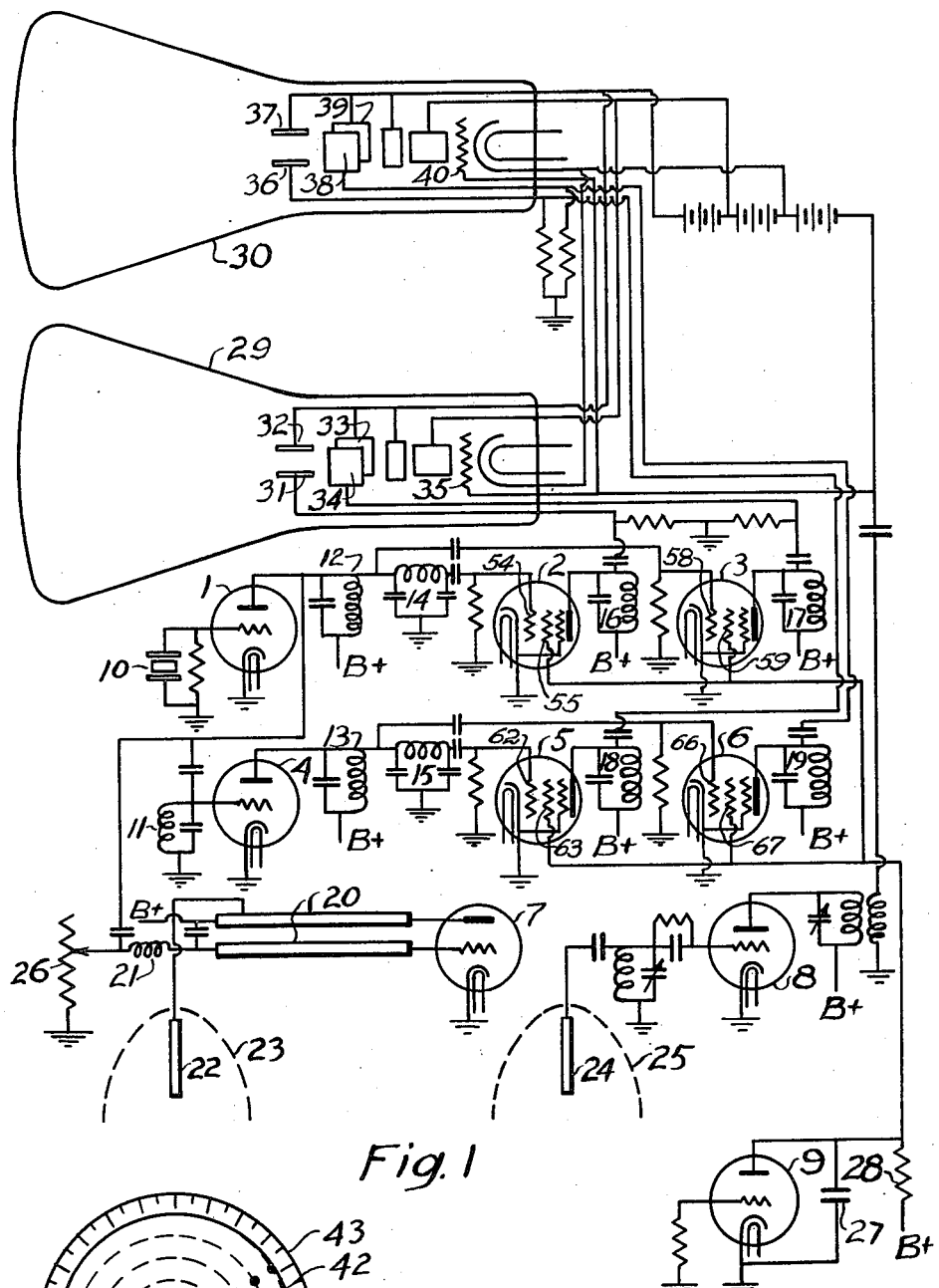

In Fig. 1, a low-frequency oscillator 1 is controlled by a crystal 10. The voltage from the plate load 12 is applied to the control grid 58 of the amplifier tube 3 direct, and through the phase shifter 14 to the control grid 54 of amplifier tube 2 so that the voltages in the plate loads 16 and 17 are out of phase by 90 degrees. The cathode-ray tubes 29 and 30 are shown as standard tubes with electrostatic deflection, but it will be understood that magnetic deflection type tubes may be substituted in all cases. The voltage from tube 2 is applied to deflection plates 31 and 32 of the cathode-ray tube 29 and the voltage from tube 3 is applied to the deflection plates 33 and 34 so that the electron beam will describe a circle on the screen.

Tube 9 is a gas filled triode or thyratron, whose plate circuit is connected to the screen grids 55, 59, 63 and 67 of tubes 2, 3, 5 and 6 respectively. In operation the grid in tube 9 blocks the flow of current through the tube while condenser 27 charges through the resistor 28 up to a point at which the grid loses control. Then the tube 9 breaks down and the condenser 27 discharges through the plate-cathode circuit. Due to the resistor 28 the plate voltage drops to zero and the grid regains control. Then the condenser 27 recharges through resistor 28, and the process is repeated. Since this voltage is also the screen grid voltages on tubes 2 and 3, and 5 and 6, the output voltages of these tubes are varied with the voltage across condenser 27 and the size of the circle on the cathode-ray tubes screen is varied from a small radius to the maximum.

Of course, this variable voltage may be applied to the tubes 2 and 3, and 5 and 6 in other ways to control the output voltage, but the circuit shown and described above is one of the simple circuits. This control voltage may also be a sine wave, instead of the saw-tooth wave generated by a thyratron, or a mechanical vibrator may be used to short-circuit the screen-grid voltage.

The output from oscillator tube 1 is also applied to the grid of auxiliary oscillator tube 4 which is tuned to a harmonic, such as the 10th, and which drives tubes 5 and 6 in the same manner that tube 1 drives tubes 2 and 3, so that the output from tubes 5 and 6 is a quarter-phase voltage at the harmonic frequency. This quarter-phase voltage is applied to the deflection plates of the cathode-ray tube 30 causing the electron beam to describe a spiral on the screen as described above for cathode-ray tube 29. If tube 4 is tuned to the 10th harmonic of the crystal 10, the electron beam in cathode-ray tube 30 will make 10 revolutions while the beam in cathode-ray tube 29, is making one. Thus, if the crystal 10 oscillates at 48.6 kilocycles, cathode-ray tube 29, will give a reading of 10,000 feet and cathode-ray tube 30 will give a reading of 1,000 feet. Thus, if a signal is reflected from a mass 5,500 feet away, tube 29 will show a reading a little past the center of the scale, while tube 30 will show a reading in the center. This allows a much closer reading to be made than could be made from one tube operated at the fundamental frequency.

It will be understood that one cathode-ray tube with a simple double-pole double-throw switch may be used to give both readings. Thus, in the above example, when the switch is turned to connect with the fundamental frequency control tubes, the cathode-ray tube will give a reading of 5,500 feet while if it is turned to connect with the harmonic control tubes the cathode-ray tube will give a reading of 500 feet. So that by throwing the switch first to one and then to the other, the total height may be read much closer than could be done if only one frequency were utilized.

Transmitter tube 7 is an ultra-high-frequency oscillator controlled by the line 20 or other type of ultra-high-frequency circuit. This transmitter oscillator tube is operated with such a high grid resistor 26 that it blocks after a few oscillations. The timing voltage from high-frequency transmitter tube 1 is applied to the grid of tube 7 through the radio-frequency choke 21 so that it oscillates for a few cycles at a certain point on each timing cycle and a short pulse of radio waves is sent out from the transmitting antenna 22 and its associated reflector 23. Transmitter tube 7 also may be controlled by an auxiliary blocking oscillator which is controlled by the fundamental timing frequency to give the short pulses. After being radiated from transmitting antenna 22 and being reflected by the earth or other reflecting mass, this pulse is picked up by receiving antenna 24 and its reflector 25, and fed to the detector receiving tube 8. The output of detector tube 8 corresponding to this pulse is applied to the grids 35 and 40 of the cathode-ray tubes 29 and 30 overcoming the high negative bias and causing a bright spot to appear on the electron beam trace. Since this trace is rapidly changing from maximum to minimum radius, and back to maximum, the spots of the individual signals are radially spaced by the spacing of the spiral turns and radially register and cause a radial line to show on the cathode-ray tube screens. Detector 8 is shown as a simple grid leak detector, but it will be understood that other types of detectors either alone or associated with amplifiers may be used to pick up the reflected wave so long as the signal is applied to the grids of the cathode-ray tube or tubes, as a positive pulse.

The grid of the harmonic driven cathode-ray tube will only receive a pulse every tenth revolution, but since the fundamental frequency is comparatively high the eye will not be able to detect any spaces.

Figure 2:
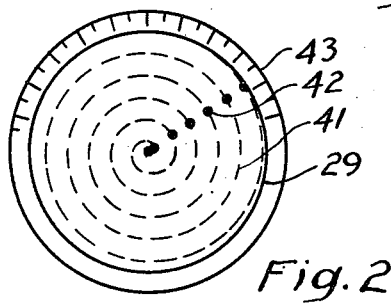
Fig. 2 shows an end view of the cathode-ray tube viewing screen.

Fig. 2 shows an end view of the screen of the cathode-ray tube 29. The electron beam trace, 41, is shown as a spiral with the signal 42 appearing at the same angular displacement on each rotation of the spiral to give a reading on the calibrated scale or dial 43.

In the system shown in Fig. 1, the signal is sent out at a certain point of the timing cycle of oscillator 1. This point is taken as the zero point on the scale of the screen of the cathode-ray tube, and may be determined by picking up some of the signal by the receiving antenna directly from the transmitting antenna, in a manner which in itself is known. This will cause a "pointer" or row of spots to appear on the screen in the zero position. If it is desired to shift the zero point as shown on the screen in order to make it coincide with some preferred pre-set scale, the zero point may be rotated by shifting the phase of the circle-forming voltages with respect to the high-frequency oscillator timing voltage.

In the operation of the system here described and shown in Fig. 1, the electron beam of the cathode-ray tube is rotating with a fixed angular velocity and is biased to cut-off or almost to cut-off. The signal is sent out at the determined zero point, the signal being a short pulse of high-frequency waves. This signal takes a definite time interval to travel out to a reflecting surface which may be present, and return to the receiving antenna and receiving unit. In the receiving unit, the pulse as received is detected and amplified in a proper number of stages to give a positive pulse. This pulse is applied to the grid of the cathode-ray tube, overcoming the normal negative bias for the duration of the pulse so that the electron beam causes an arc of the circle or spiral turn it is making to glow brightly. Since the pulse is of very short duration, the arc is very short and appears as a single spot rather than as an arc. Since the impulse generator or thyratron causing the spiral forming variable magnitude voltage is not controlled or locked in by the timing or circle-forming voltages, the spirals will occur at random intervals. If the bias on the cathode-ray tube is reduced until the beam causes the screen to fluoresce, no single spiral will be seen but the whole area of the circle within the maximum diameter will glow. Since the circle-forming voltage and the received signal both have the same frequency, the signal comes at the same angular displacement from the determined zero point for each revolution of each turn of the spiral, so that all the spots will lie along the same radial line. Due to the persistence of vision and the persistence of fluorescence of the cathode-ray tube screen, the eye will see a continuous line or pointer of light.

The interpolation reading or "vernier" effect of the auxiliary cathode-ray tube 30 is obtained because the electron beam in auxiliary cathode-ray tube 30 is rotating at a multiple or harmonic of the angular velocity of the beam in the principal cathode-ray tube 29. If the tenth harmonic is thus employed, the beam in auxiliary cathode-ray tube 30 rotates ten times while the beam in principal cathode-ray tube 29 is rotating once. In the case of a signal from a reflecting mass 5500 feet away, the beam in auxiliary cathode-ray tube 30 would make five complete revolutions plus one-half of a revolution, and the pointer would read 500 feet since no means is provided on auxiliary cathode-ray tube 30 to indicate how many complete revolutions have been made. The beam in principal cathode-ray tube 29 however is rotating at only one-tenth of the angular velocity of the beam in auxiliary cathode-ray tube 30, and would complete a rotation of only 198° and the pointer would be clearly seen to be between 5000 and 6000 feet, and the true distance would be read from the two dials, as 5000 from tube 29, plus 500 from auxiliary tube 30, or 5500 feet final reading, as in the manner of reading registering watt-hour meters.

Figure 3:
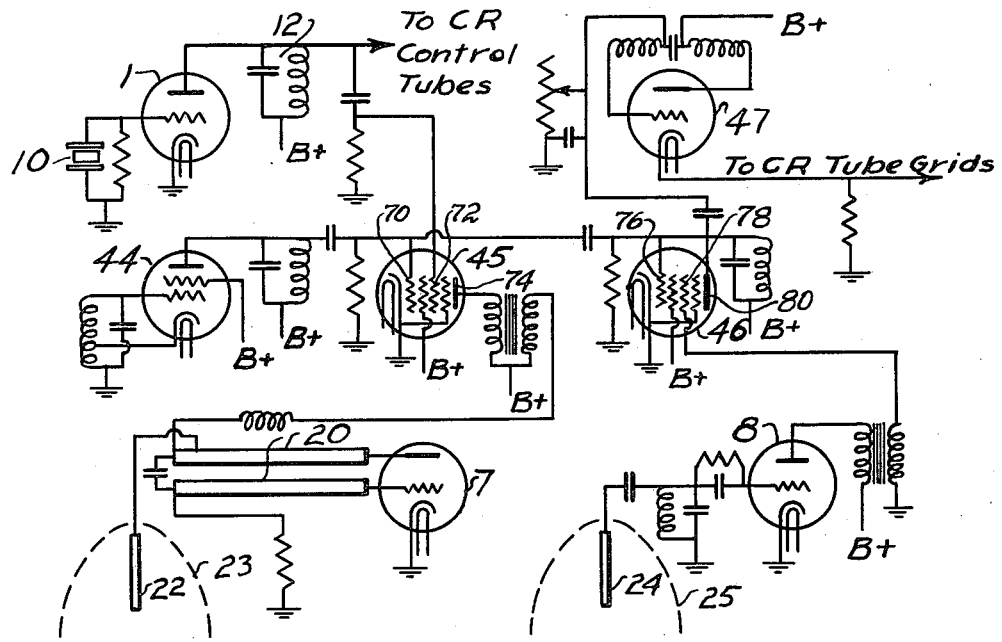
Fig. 3 shows a modification in which a modulated wave is used with an auxiliary beat note oscillator.

Fig. 3 shows a modification of this invention in which I use a radio wave modulated not more than 100 per cent. In this figure I use similar numbers to indicate parts shown and described in Fig. 1. The output of the crystal controlled oscillator 1 is used to drive the control tubes of the cathode-ray tubes as in Fig. 1. The output of this oscillator is also connected to grid 72 of a mixer or beat note tube 45. Auxiliary oscillator tube 44 is tuned to oscillate at some frequency higher or lower than tube 1 by a small amount and the output of this tube is connected to grid 70 of mixer tube 45. Since the plate load or mixer tube 45 is an audio-frequency transformer or choke, the output will be an audio beat note which is the difference between the frequency of principal timing oscillator tube 1 and that of auxiliary beat-frequency oscillator tube 44. This audio frequency is used to modulate the output of high-frequency transmitter tube 7 in the conventional manner, either directly or after amplification. The modulated high-frequency wave is sent out from the shielded directive antenna 22. The associated screen 23 prevents any direct wave from reaching the receiving antenna.

The return wave is picked up by the antenna 24 with its screen 25 and detected by detector tube 8. The resultant detected audio frequency is fed to grid 78 of a further mixer tube 46. The grid 76 of mixer tube 46 is connected to the output of auxiliary oscillator tube 44, so that the beat note in the plate circuit of mixer tube 46 is the original timing frequency of timing oscillator tube 1. The phase, however, will be shifted by the time necessary for the radio wave to be sent out and returned. The frequency from the plate 80 of tube 46 is used to control a further auxiliary tube 47 which may be a blocking oscillator, to give a very sharp peaked positive pulse to apply to the cathode-ray tube grids. Since the auxiliary oscillator 44 is used both to derive the audio frequency and also to beat with it, to derive the original timing frequency, it is not necessary for it to be tuned to any particular frequency as long as the beat note falls in the range of the audio components. I use the pulse across the cathode resistor of a blocking oscillator to apply to the cathode-ray tube grids as this is a very sharp positive pulse.

Figure 4:
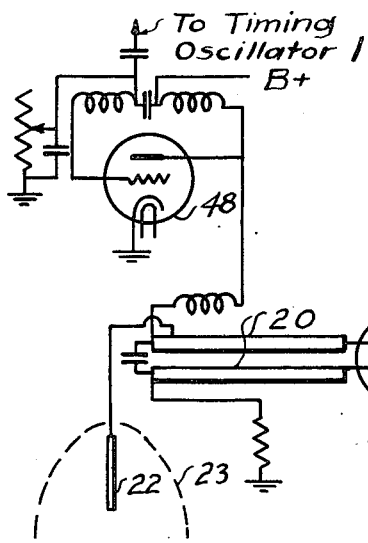
Fig. 4 shows a further modification in which timing pulses are added to a continuous carrier.

Fig. 4 shows a modification of this invention in which I use a constant radio carrier wave with short pulses added at the timing frequency. This pulse may be positive or negative so long as the final pulse applied to the grids of the cathode-ray tubes is positive. The blocking oscillator 48 is controlled by the timing oscillator 1 so that it adds a sharp pulse to the output of the high-frequency oscillator 7 sent out from the antenna 22 with its reflector 23. The return wave is picked up by an antenna, detected, and the pulse is applied to the cathode-ray tube grids as shown in Fig. 1.

Figure 5:
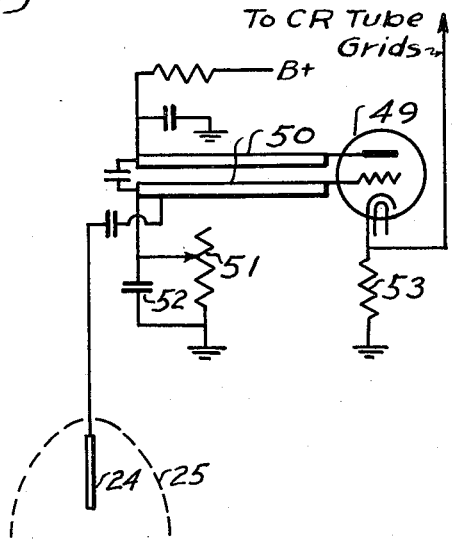
Fig. 5 shows a pulse detector for use with the transmitting blocking oscillator of Fig. 1.

Fig. 5 shows a special pulse detector which may be used to detect the short pulses sent out by a blocking oscillator such as that shown in Fig. 1. The reflected pulses of high-frequency waves are picked up by the antenna 24 and applied to the blocking oscillator 49 without detection. The oscillator 49 is tuned to the same frequency as the sending oscillator 7 by the tuned line 50 or other type of ultra-high-frequency tuning control. The blocking period is set by resistor 51 and condenser 52 so that when no wave is picked up the blocking period is very close to the period of the sending oscillator. When a series of pulses is picked up, the oscillator locks in step and the pulse from the cathode resistor 53 is applied to the grids of the cathode-ray tubes.

I have shown and described above certain means whereby my invention may be carried out, but it will be understood, that I do not wish to be limited to any particular circuits or construction since many modifications may be made without departing from the spirit of this invention.

Having now described my invention, I claim:

1. In an indicator for use in an absolute altimeter or for indicating phase differences between any cyclically recurrent voltages, a timing oscillator having either the same frequency or some subharmonic of the frequency of the voltage to be examined for the phase difference between it and the timing frequency, a 90 degree phase shift circuit, a device to vary cyclically the resultant quarter-phase voltage from zero to maximum, a cathode-ray tube with a high negative bias on the grid, with the deflection plates connected to said quarter-phase circuit so that the electron beam traces a series of spirals, a sharp pulse generating device controlled by the voltage to be examined and connected so as to apply a sharp positive pulse to the grid of the cathode-ray tube overcoming the negative bias and causing a bright spot to appear at a certain point for each 360 × N degrees of rotation of the electron beam, where N is a whole number, and, as the diameter of the electron beam spiral varies cyclically from zero to maximum, traces a radial line from the center to the periphery of the screen.

2. In combination, a cathode-ray tube having horizontal and vertical ray-deflection means, a control grid, and a fluorescent screen, an oscillation generator, means for deriving quarter-phase potentials from said generator, connections including amplifying means for applying said quarter-phase potentials to said ray-deflection means respectively, means for periodically varying the amplification of said amplifying means substantially from zero to maximum to cause the quarter-phase potentials applied to said deflection means to vary from zero to maximum to trace a recurrent spiral on said fluorescent screen with said ray, and signal means adapted and connected for applying a signal of the same frequency as said oscillation generator to said control grid of said cathode-ray tube, said amplifying means including multiple-grid tubes each having a screen grid, and the means for varying the amplification of said amplifying means comprising a thermionic device connected to the screen grids of said mutiple grid tubes to periodically vary the potential applied to the screen grids of said multiple-grid tubes.

3. In a phase difference indicator, a principal timing oscillator producing oscillations of a determined relatively low frequency, a separate tuned circuit in which are present oscillations of said same determined frequency and originating from said first named oscillations, a detector connected for detecting the oscillations in said separate tuned circuit, a principal cathode-ray tube having pairs of deflecting plates and a control grid, a principal quarter-phase voltage unit comprising a pair of multi-grid tubes each having one of its grids connected to the output of said principal timing oscillator and a quadrature delay network included in the connection of one of said multi-grid tubes to said principal timing oscillator, a pulse producing oscillator having its output connected to another grid of each of said multi-grid tubes respectively, the outputs of said multi-grid tubes being respectively connected to said pairs of deflecting plates of said principal cathode-ray tube, means for normally applying an obscuring negative bias to the grid of said cathode-ray tube, and a connection from the output of said detector to said grid of said cathode-ray tube for applying thereto a potential opposing said normal bias and which corresponds to the frequency present in said separate tuned circuit.

4. In a phase difference indicator, a principal timing oscillator producing oscillations of a determined relatively low frequency, a separate tuned circuit in which are present oscillations of said same determined frequency and originating from said first named oscillations, a detector connected for detecting the oscillations in said separate tuned circuit, a principal cathode-ray tube having pairs of deflecting plates and a control grid, a principal quarter-phase voltage unit comprising a pair of multi-grid tubes each having one of its grids connected to the output of said principal timing oscillator and a quadrature delay network included in the connection of one of said multi-grid tubes to said principal timing oscillator, an independent pulse-producing oscillator whose period is independent of said timing oscillator and having its output connected to another grid of each of said multi-grid tubes respectively, the outputs of said multi-grid tubes being respectively connected to said pairs of deflecting plates of said principal cathode-ray tube, means for normally applying an obscuring negative bias to the grid of said principal cathode-ray tube, and a connection from the output of said detector to said grid of said principal cathode-ray tube for applying thereto a potential opposing said normal bias and which corresponds to the frequency present in said separate tuned circuit.

5. A phase difference indicator as set forth in claim 3, and an auxiliary timing oscillator oscillating at a frequency which is a multiple of the frequency of said principal timing oscillator and is synchronously controlled thereby, an auxiliary cathode-ray tube having pairs of deflecting plates and a control grid, an auxiliary quarter-phase voltage unit comprising a pair of auxiliary multi-grid tubes each having one of its grids connected to the output of said auxiliary timing oscillator and a quadrature delay network included in the connection of one of said auxiliary multi-grid tubes to said auxiliary timing oscillator, said pulse producing oscillator having its output connected to another grid of each of said auxiliary multi-grid tubes respectively, outputs of said auxiliary multi-grid tubes being respectively connected to said pairs of deflecting plates of said auxiliary cathode-ray tube, and connections for applying to the grid of said auxiliary cathode-ray tube the same negative bias and the same detector output voltage as is applied to the control grid of said principal cathode-ray tube.

CHARLES A. DONALDSON.